United States Patent Office 2,947,929
Patented Aug. 2, 1960

2,947,929
DIGITAL-ANALOG SERVO CIRCUIT

John L. Bower, Downey, Calif., assignor to North American Aviation, Inc.

Filed Dec. 23, 1955, Ser. No. 555,176

18 Claims. (Cl. 318—28)

This invention relates to a digital-analog servo circuit and, more particularly, a servo circuit utilizing digital control signals modified by analog control signals within increments of the digital system.

The basic problem to be solved with a device of this type is the accomplishment of a precise mechanical motion in accordance with an electrical signal. This is accomplished, in general, by the use of the principles of servo mechanisms and closed loop techniques. The desired mechanical motion may be the positioning of a worktable, the rotation of a shaft, the rotation of a gear, or some other form of motion. As the motion occurs, signals are generated indicating whether or not the desired mechanical motion is being obtained. A source of control, a director, provides signals requiring a particular mechanical motion, pickoffs capable of sensing motion provide signals indicating the motion of, for example, a worktable, and an actuator responds to move the worktable according to the difference between the directed position and the indicated position.

An electrical signal may be digital in form, that is, it is variable in discrete, readily-distinguishable steps or pulses, or in the alternative, it may be analog in form, that is, it is continuously variable over its range. The value of a digital signal is readily ascertainable. However, in some systems, as will be seen later, it lacks in information between successive digital numbers. A servo circuit utilizing a digital scheme is illustrated in a patent issued January 9, 1951, to Eugene Seid et al., No. 2,537,-427, entitled Digital Servo. An analog voltage signal, on the other hand, provides continuous variation over its range but encounters the difficulties of precision in signal values and circuit components and the difficulty of producing a reliable analog signal having an extended range.

The lack of information between successive discrete signal values in a digital system may, in a servo system, for example, cause the servo to oscillate within the range indicated by each discrete increment. Consequently, within the range of a digital, or discrete, increment, there is doubtful accuracy of the servo.

This system utilizes a digital information system that resolves the inaccuracies of digital information voltages by addition of an analog voltage. Thus, in effect, a digital servo is obtained whose fine positioning is achieved through the use of an analog signal.

It is therefore an object of this invention to provide a digital-analog servo circuit.

Another object of this invention is to provide a digital servo system producing an error signal which varies linearly with execution of directed motion.

It is a further object of this invention to provide an improved digital servo circuit having an analog modification.

Another object of this invention is to combine a digital input signal with a signal having a periodic variation.

Still another object of this invention is to provide a means of determining the exact difference between a digital input signal and a periodically-varying signal such as a sinusoid.

Still another object of this invention is to provide a digital servo circuit having positive indication between digital increments of information.

A still further object of this invention is to provide a servo circuit capable of indicating the difference between an input digital signal and the number of periodic variations of an input electrical signal to the exact phase angle of the periodic signal.

Another object of this invention is to provide a servo circuit which produces an output exactly proportional to the difference between an input digital signal and a periodically-varying signal.

Other objects of invention will become apparent from the following description taken in connection with the accompanying drawings in which Fig. 1 is a schematic diagram of the device of the invention;

Figure 1:
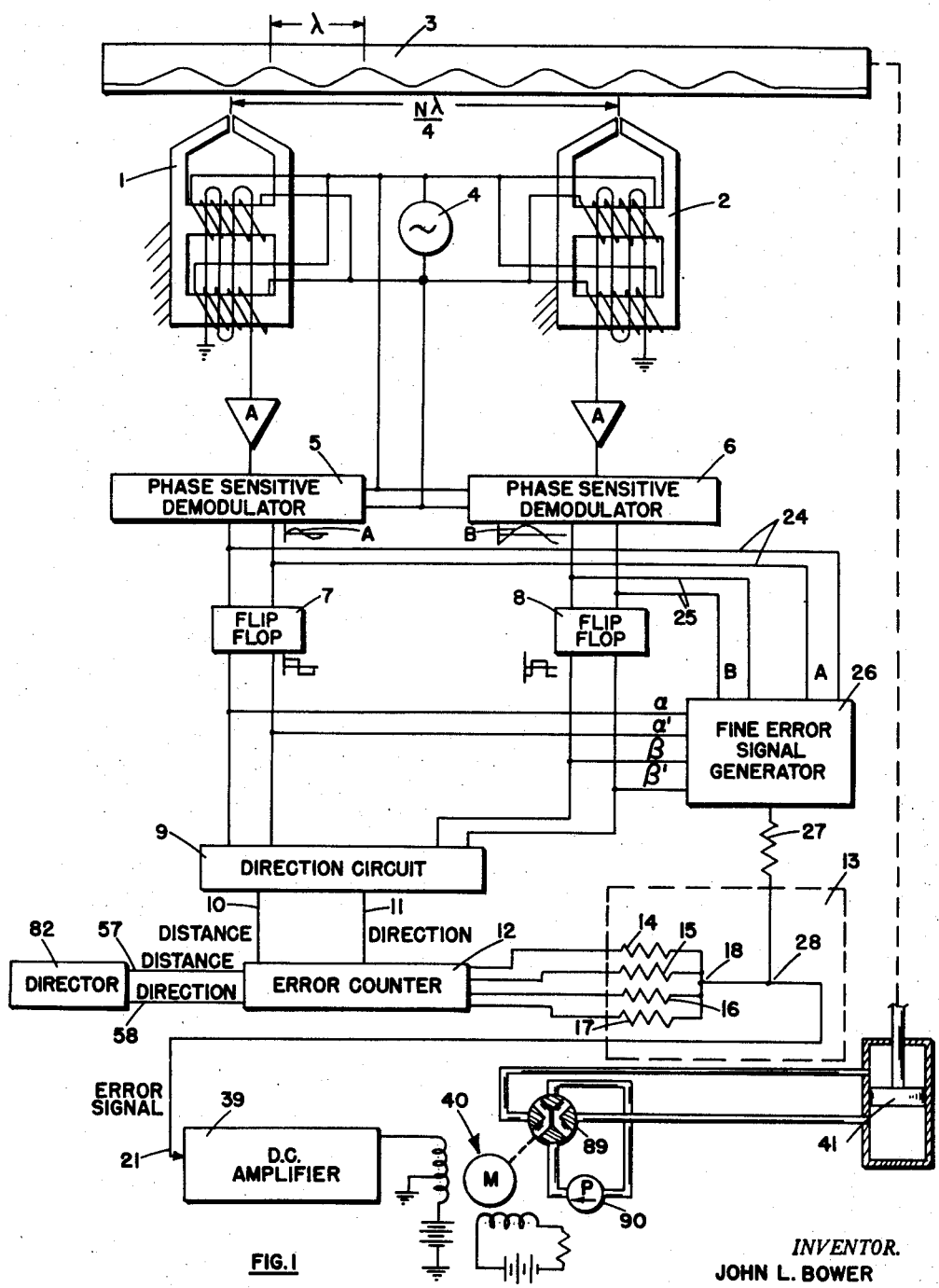

Fig. 1 shows two pick-up heads 1 and 2 designed to read a periodically-varying signal recorded on member 3. The signal may be a magnetic recording and the heads may be those termed "saturable reactor" type heads which provide indications without the requirement of relative movement between heads and magnetic track recorded on member 3. The periodically-varying signal may be generally sinusoidal in form. The signal produced by these heads may be non-varying (as for example, when the heads are stationary) or varying (when the heads are moving). As the heads move, the signal varies periodically, reproducing the recorded sine wave which is, of course, a periodic function. An oscillator 4 provides excitation to the heads 1 and 2 which, in turn, provide an output to phase sensitive demodulators 5 and 6, respectively. Oscillator 4 also provides a demodulating reference frequency to demodulators 5 and 6. Heads 1 and 2 are spaced an odd number (N) of quarter-wavelengths $$\frac{(\lambda)}{4}$$

apart along the magnetic recording.

Figure 2:
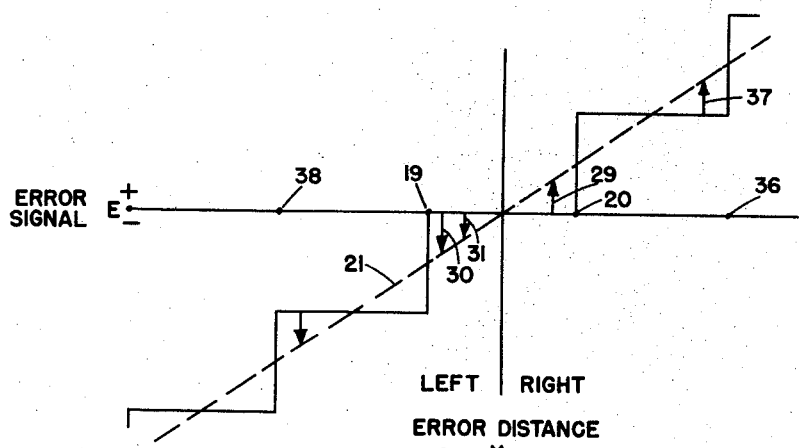
Fig. 2 is a graph showing error signals received in a digital system.

Flip-flops 7 and 8 are connected to receive the output of demodulators 5 and 6, respectively, and provide a square wave output. Flip-flop 7 may be said to be an analog to digital converter in one concept, changing a smoothly-changing variable to a signal of discrete values, such as a readily-distinguishable square wave. In another sense, each flip-flop indicates, or counts, the periodic variations of the sinusoidal wave; or the flip-flop may be considered as a single stage counter which counts one complete period of the received sinusoidal wave by returning to its original state. The same may be said of flip-flop 8. These flip-flops indicate successive half-wavelengths by changing their respective states. A direction circuit 9 is connected to receive the outputs of flip-flops 7 and 8 and provide a pulse on line 10 for each quarter-wavelength of relative motion of heads 1 and 2 with respect to member 3 and a voltage on line 11 indicating the direction. Error counter 12 is adapted to receive input instruction signals from director 82 in the form of digital electrical signals (that is, signals having discrete values) and compare with the input pulses received on lines 10 and 11, and provide an output to summing network 13 consisting of resistors 14, 15, 16 and 17 which are related to each other by a factor of two and are termed a digital-to-analog converter. The summed output of these resistors at point 18 is a voltage representing the difference between the number of quarter-wavelengths heads 1 and 2 are directed to move and the actual number of quarter-waves they have moved along the magnetically recorded track. The error voltage provided by these resistors at point 18 increases or decreases step-wise, as indicated in Fig. 2. It is this step-wise variation that provides the ambiguity of the signal which may lead to oscillation of a digital servo within the limits of each step. Thus, the error distance may change from 19 to 20 without appreciable change in the error signal. It would be more desirable if the error signal changed in accordance with dotted line 21 as the error distance increased. The concept of the invention is to modify the step signal so as to provide the continuously-varying signal 21.

Figure 3:
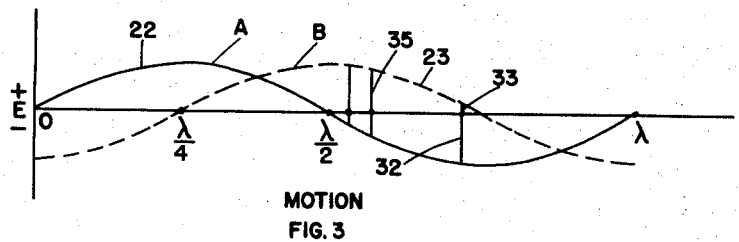
Fig. 3 is a graph of two sinusoidal signals displaced in phase, representing signals picked up by motion along a magnetically recorded track.
Figure 4:
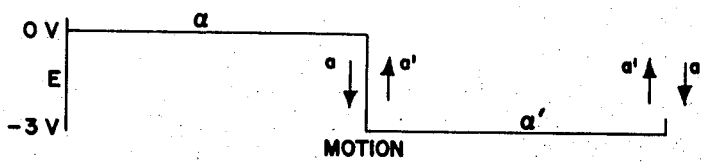
Fig. 4 is a square wave output provided by a flip-flop receiving wave A of Fig. 3, and a square wave output provided by a flip-flop receiving wave B of Fig. 3.
Figure 4:
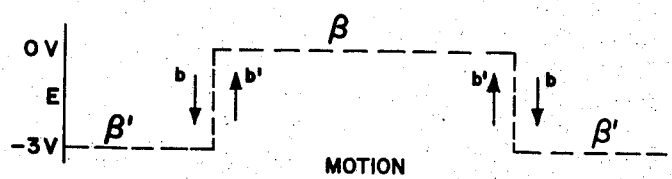

As the head 1 moves with respect to stationary member 3, it provides a sine wave 22 illustrated in Fig. 3. At the same time, head 2 moves, and sine wave 23 is provided which is one quarter-wavelength out of phase with sine wave 22. It is the signals provided by these heads which provide a continuously-varying signal which may be used to modify the step output illustrated in Fig. 2 to obtain line 21. Referring to Fig. 1, lines 24 and lines 25 pass these sinusoidally-varying signals to a fine error signal generator 26 which, in turn, passes a correcting voltage through resistor 27 to junction point 28 to provide a continuously-varying error signal. Through resistor 27 to point 28, then, is fed correcting voltages such as positive voltage of magnitude indicated at 29 in Fig. 2 or negative voltages indicated as having magnitudes 30 or 31 in Fig. 2. These correcting voltages are generated in generator 26, Fig. 1, by selective addition and subtraction of the sinusoidal waves A and B illustrated in Fig. 3. The selection is made according to the signals then being received from the outputs of flip-flops 7 and 8 which signals are indicated as being $\alpha$, $\alpha'$, $\beta$ and $\beta'$ indicating the two states of each flip-flop. Fig. 4 represents these signals and illustrates their relative phase. The signals are obtained, of course, as explained previously, from the sinusoidal signals 22 and 23 which were referred to as signals A and B, respectively. To obtain voltage 29 shown in Fig. 2, the negative of voltage 32 is added to the negative of voltage 33, Fig. 3. Voltages 31 and 30, Fig. 2, are similarly obtained. Correlating Figs. 2, 3 and 4, this is expressed as follows: If the error distance lies between points 19 and 20 (which occurs during the existence of $\alpha'$ and $\beta$), the correcting voltage, $e_1$, may be obtained by adding the negative of sine wave A to the negative of sine wave B. The logical notation is:

$$\alpha'\beta \rightarrow (e_c = -A-B) \quad (1)$$

where $e_c$ is the correcting voltage. If the error distance is as great as between point 20 and point 36 (when occurs at $\alpha'$ and $\beta'$), the correcting voltage, $e_c$, is obtained by adding voltage A to the negative of voltage B. The logical equation is indicated as follows:

$$\alpha'\beta' \rightarrow (e_c = A-B) \quad (2)$$

If the error distance lies between point 19 and point 38 (which always occurs at $\alpha$ and $\beta$), the correcting voltage is obtained by subtracting voltage A from voltage B. Logical notation is as follows:

$$\alpha\beta \rightarrow (e_c = B-A) \quad (3)$$

A remaining correction term during the internal $\alpha$ and $\beta'$ is as follows:

$$\alpha\beta' \rightarrow (e_c = A+B) \quad (4)$$

These equations may be combined as follows:

$$e_c = [\alpha'\beta](-A-B) + [\alpha'\beta'](A-B)$$
$$+ [\alpha\beta](B-A) + [\alpha\beta'](A+B)$$

Where the brackets [ ] indicate the factor 1 or 0 according to the existence or nonexistence, respectively, of the propositions expressed within the bracket. These four equations represent the logical switching and generating provided by generator 26. The flip-flops 7 and 8 inform the generator of $\alpha$, $\alpha'$, $\beta$, and $\beta'$ and generator 26 combine waves A and B accordingly to provide a correcting voltage such as voltage 29, Fig. 2. The step voltage output of Fig. 2 is thus changed to become a continuous voltage 21 as the servo system drives according to its input.

In another manner of explanation, it may be considered that generator 26 is gate-controlled to pass through various sums or differences of the analog voltages being produced by the heads or transducers of the invention. It is apparent that the invention is not limited to transducers such as magnetic heads but also includes other types whose outputs vary as a periodic function of the information sensed. Resolvers, for example, which change angular rotations to electrical signals may provide the analog voltages provided by heads 1 and 2 in Fig. 2. These analog voltages are added to the step voltages provided by the output of the digital comparison means. The signal 21, which is produced at point 28, is then sent to an amplifier 39, Fig. 1, which operates a motor and valve 40, for example, and a piston 41 which may be utilized to drive heads 1 and 2 along member 3, or to drive the member 3 relative to the heads, as is illustrated.

It can be readily understood that rotary motion may be controlled as well as longitudinal motion. It may be further understood, as stated above, that other forms of pick-up heads and other forms of recorded information may be utilized. For example, optical pick-up devices may be utilized, or in other examples, reluctance type pick-up devices may be utilized. The concept of the invention is to provide a signal indicating the error difference between an instructed digital signal and a sensed signal to a more accurate degree than has heretofore been obtained.

Figure 5:
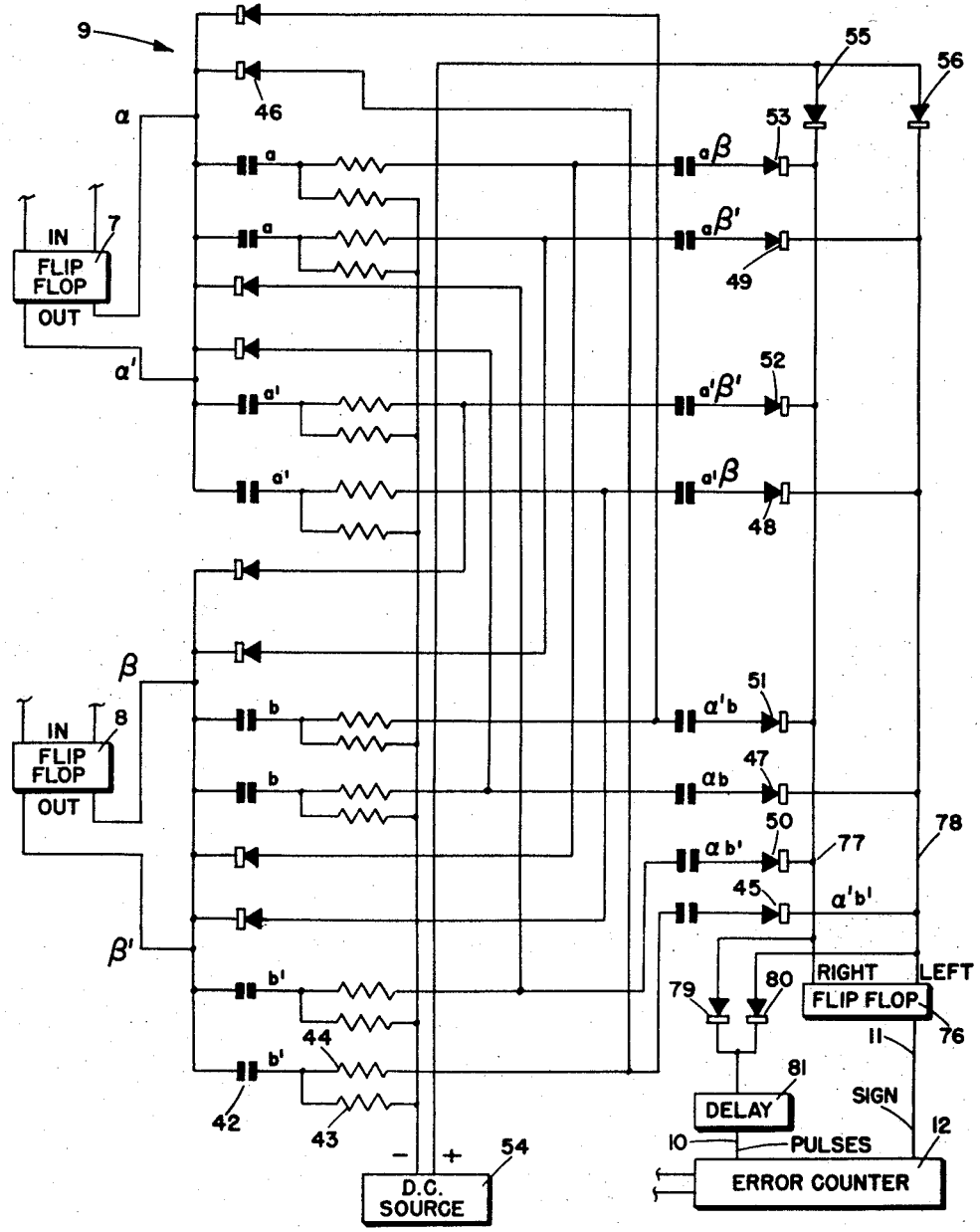
Fig. 5 is a schematic of the direction circuit of Fig. 1.

Fig. 5 illustrates, in more detail, direction circuit 9. The function of this circuit is to receive the inputs of flip-flops 7 and 8 and provide information as to executed motion and direction. This may be a pulse on line 10 for every quarter-wavelength the heads move and a voltage on line 11 to indicate the direction.

In other embodiments, these pulses may be generated according to other multiples or submultiples of wavelengths. From a consideration of the outputs of the two flip-flops illustrated in Fig. 4, motion to the right may be represented as R:

$$R = \alpha b' + a\beta + \alpha' b + a'\beta' \quad (5)$$

Motion to the left may be represented as L:

$$L = \alpha b + a'\beta + \alpha' b' + a\beta' \quad (6)$$

wherein $a$ indicates change from $\alpha$ to $\alpha'$ and $b'$ indicates changes from $\beta'$ to $\beta$ and $a'$ indicates change from $\alpha'$ to $\alpha$ and $b$ indicates change from $\beta$ to $\beta'$. Equation 5 may be interpreted literally as a right motion, R, exists if $\alpha$ and $b'$ exist or if $a$ and $\beta$ exist, or if $\alpha'$ and $b$ exist, or if $a'$ and $\beta'$ exist. A motion to the left, L, from Equation 6 may be interpreted literally as occurring if $\alpha$ and $b$ exist, or if $a'$ and $\beta$ exist, or if $\alpha'$ and $b'$ exist, or if $a$ and $\beta'$ exist. Mechanization of Equations 5 and 6 will provide an indication, a pulse for example, every quarter-wavelength of wave A, Fig. 3. The resolution of the circuit is, therefore, to one-quarter of the wavelength of the recorded track on element 3, Fig. 2. Fig. 5 illustrates the circuit obtaining the logic of Equations 5 and 6. Propositions $\alpha$ and $\alpha'$ are represented alternatively by the two states of flip-flop 7 (Fig. 1) and propositions $\beta$ and $\beta'$ are represented by the alternative states of flip-flop 8. It is noted, from the graph of Fig. 4, that $a$, $a'$, $b$ and $b'$ are changes in state of the flip-flops and are obtained therefore by derivative circuits which detect changes. These derivative circuits are, for example, capacitor and resistor combinations such as, capacitor 42 and resistor 43, Fig. 5.

It is assumed that the output of each flip-flop is zero volts on a first line and −3 volts on the other. When, for example, flip-flop 7 changes from α to α' the −3 volts then appears on the first line and zero volts appears on the other. The −3 volts may be taken to represent a true condition or the existence of a proposition. When, for example, flip-flop 8 changes from state β' to β (indicating the proposition previously described as b') a positive pulse passes through the capacitor 42 and resistor 44. The pulse can then proceed through diode 45 to line 11 and indicate a left motion unless the pulse is positive with respect to the voltage on the cathode of diode 46 (caused by flip-flop 7 being in the α state) (−3 volts). But, if the flip-flop 7 is in the α' state, diode 46 is biased in the non-conducting direction and the pulse from capacitor 42 passes into the left counter indicating the coincidence of b' and α' which, it will be noted in Fig. 4 and Equation 5, indicates a motion to the left. Each of the other lines convey similar logic to the output of the device. Flip-flop 76 indicates by zero volts or −3 volts the direction of motion, left or right. It receives a pulse on line 78 through diode 45 if the proposition b' and α' exist or through diode 47 if the proposition bα exist or diode 48 if a'β exist or diode 49 if aβ' exist. Similarly, line 77 receives information through diodes 50, 51, 52 and 53 to indicate motion in the right direction. D.C. source 54 holds the lines connected to resistors, such as, 43 and 44 below ground. It may also be desirable to use D.C. source 54 to provide a clamp for the outputs of flip-flops such as 7, 8 and 76 to prevent their outputs from swinging too far negative. Thus, output pulses are possible only on lines whose control diodes such as 46 have cathodes at ground (i.e., zero volts).

Diodes 55 and 56 insure that only positive pulses are provided on lines 77 and 78. Diodes 79 and 80 add all pulses together and pass them to error counter 12. Delay device 81 assures that pulses are not received through diodes 79 and 80 and flip-flop 76 simultaneously.

Error counter 12 is connected to receive the output of delay 81 which indicates the number of quarter-wavelengths the heads have moved and the output of flip-flop 76 which indicates whether it is to the right or left and compare with input digital signals from director 82, Fig. 1, which indicate the required number of quarter-wavelengths desired to be moved to the right or to the left. A signal, for example, from director 82 on line 57, a pulse, would indicate an instructed motion a one-quarter wavelength and, on line 58, the voltage would indicate the instructed motion is to the left. Lines 10 and 11 indicate the execution of these motions and error counter 12 always indicates the error between directed and executed motion. This indication can be used to servo control the executed motions according to directed signals.

Figure 6:
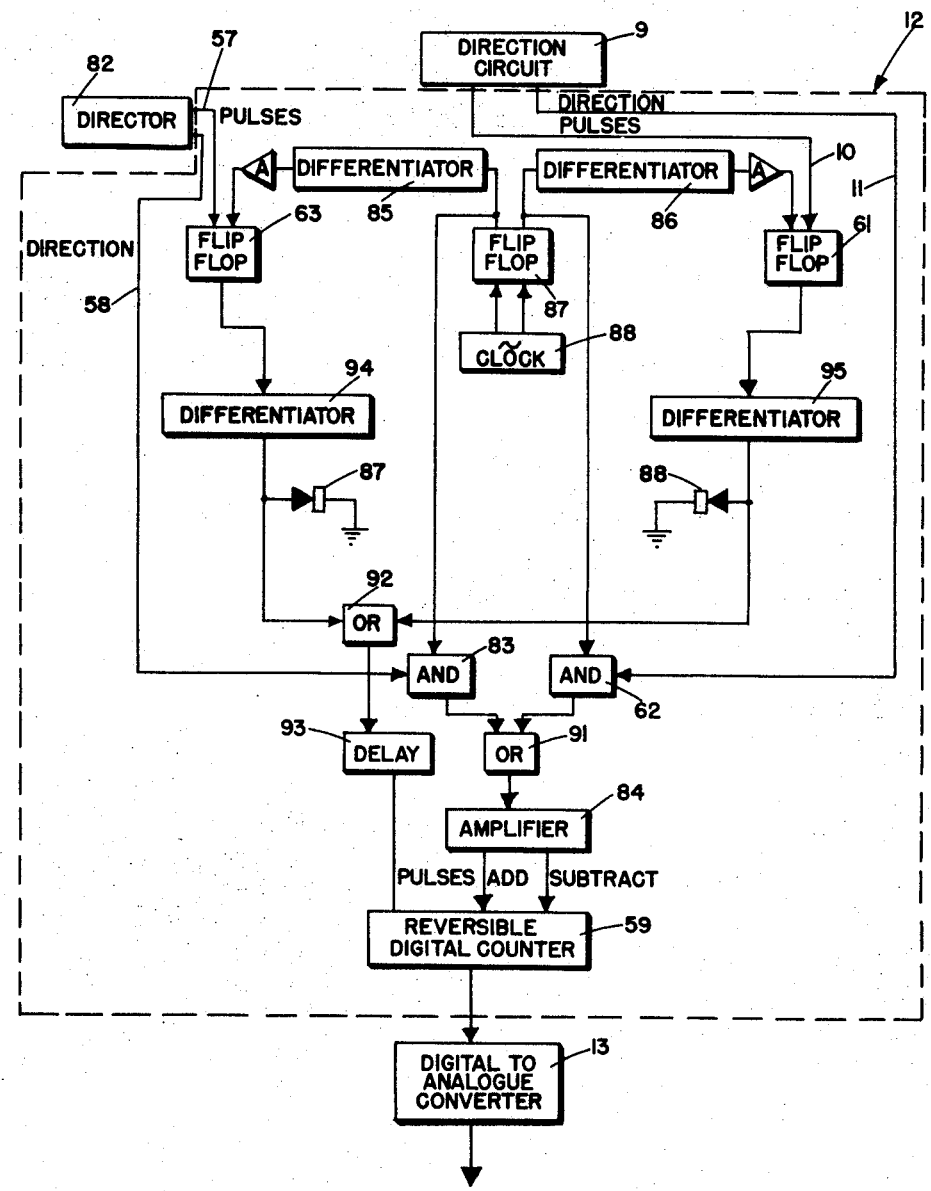
Fig. 6 is a schematic of the error counter of Fig. 1.

In Fig. 6 is illustrated the error counter 12 which comprises mainly a circuit which synchronizes the pulses from the director 82 and direction circuit 9 so they cannot arrive simultaneously and thus cause confusion, and a reversible digital counter 59 which counts pulses received according to the sign received. Such synchronizer and counter are well-known within the art and may be found in the teachings of the patent to Seid et al., referred to hereinbefore. A random pulse synchronizer which prevents the possibility of pulses being received while sign reversal is occuring is taught in the patent to W. Hochwald issued May 15, 1951, No. 2,552,968, entitled Random Pulse Synchronizer. Fig. 3 of that patent is referred to specifically.

In Fig. 6, direction circuit 9 provides pulses to flip-flop 61 on line 10 indicating distance the heads have moved relative to the magnetic track. On line 11, is provided the direction signal to "and" gate 62. Flip-flop 63 receives pulses indicating distance directed to be moved from director 82 on line 57. On line 58, is provided the direction signal to "and" gate 83. The outputs of "and" gates 83 and 62 are connected to "or" gate 91 to drive push-pull, sharp control amplifier 84. Amplifier 84 is a saturating-type amplifier which in one state causes the counter to add and in the other state causes the counter to subtract. It will be remembered that the counter is storing the difference between the directed pulses and the executed pulses. Therefore, the output sense of director 82 and direction circuit 9 should be chosen accordingly. For example, pulses (from the director) directing motion to the right add, and pulses (from the direction circuit) indicating executed motion to the right subtract, leaving the difference, or error, stored in the counter. Directed pulses to the left subtract and executed pulses of motion to the left add, indicating the error.

Flip-flops 61 and 63 are alternately reset if they become set at a high rate by differentiators 85 and 86 by flip-flop 87 as it changes state. Clock 88 (oscillator, pulse generator, or multivibrator) drives flip-flop 87 which provides pulses which are gated through "and" gates 83 and 62 and "or" gate 91 to amplifier 84. When each flip-flop 63 or 61 is reset by the clock, differentiators 94 and 95 provide pulses to "or" gate 92. Delay 93 adds an interval of delay, less than one clock pulse interval, to insure that the counter receives the pulses after the sign signal has been received. To insure that only reset pulses are received at "or" gate 92, diodes 87 and 88 short-out pulses of other polarity. By the circuitry of Fig. 6, a pulse may be received at random from both direction circuit 9 and director 82 and first one and then the other is passed to counter 59 together with its appropriate sign. The state of the counter is controlled according to the sign by the saturating amplifier 84 upon each clock pulse, which clock pulse simultaneously resets the flip-flops 61 or 63 if they need resetting. Upon resetting, of either flip-flops 63 or 61, the counter receives a pulse from "or" gate 92 and delay 93. Thus, the sign signal reaches the counter first so it can add or subtract the delayed pulse when it arrives.

Digital to analog converter 13 transforms the error stored in counter 59 into an analog signal to be used to control the relative motion of the heads and magnetized member. Various schemes of conversion may be used, such as provides a phase reversible A.-C. output or, in the alternative, a simple D.-C. output in which D.-C. above a certain level rotates a motor in one direction and below that level rotates the motor in another direction. The latter system is illustrated in Fig. 1 in which the output of D.-C. amplifier 39 above a certain voltage causes the motor 40 to turn in one direction and below that voltage causes it to turn in the opposite direction. Motor 40 controls valve 89 which, in turn, controls the pressure from pump 90 to cause hydraulic actuator 41 to move the member 3 relative to the magnetic heads 1 and 2.

Fig. 6 is considered to be an illustrative example of pulse synchronizing. Other devices adapted to synchronize and count the difference between pulse trains from two input pulse sources may likewise be adapted for use. It is to be noted also that the pulse information may occur as pulses on one line indicating a motion to the right and motion on the other line indicating motion to the left, as at lines 77 and 78, Fig. 5. The information may also be handled in other forms such as that shown by lines 10 and 11, Fig. 5, in which one line provides the pulses indicating distance and the other line indicates direction. Transformation from one method to another is straight-forward as shown in that figure.

If reversible counter 59 is binary, a simple type of digital to analog converter is one in which resistors 14, 15, 16 and 17 are successively related to each other in the relationship of two to one where each resistor is connected to the output of stages of the counter in order of decreasing significance. Reference is again made to the patent to Seid et al., specifically Fig. 7.

Figure 7:
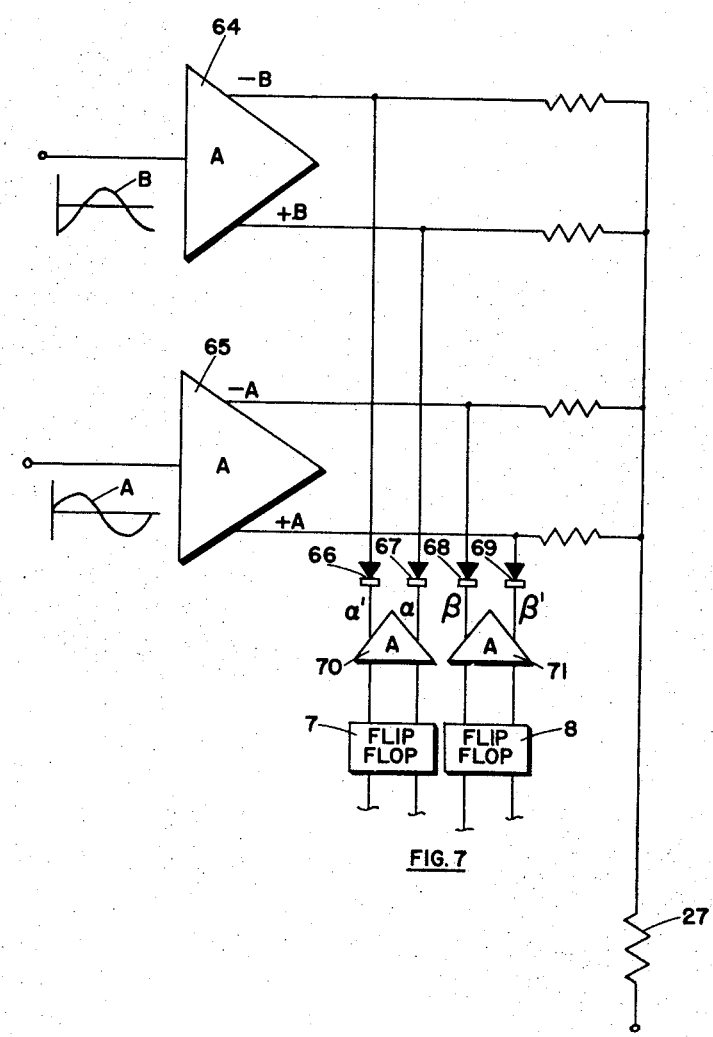
Fig. 7 is a schematic of the fine error generator of Fig. 1.

Fine error signal generator 26 is illustrated in Fig. 7 and mechanizes logical Equations 1, 2, 3 and 4. The amplitudes of sine waves A and B are received at push-pull amplifiers 64 and 65. Amplifier 64 provides −B on one line and +B on the other. Amplifier 65 provides −A on one line and +A on the other. Diodes 66, 67, 68 and 69 gate voltages A and B according to the signals $\alpha$, $\alpha'$, $\beta$ and $\beta'$ indicated as being received from flip-flops 7 and 8 through amplifiers 70 and 71. Proper operation may be achieved, for example, if flip-flops 7 and 8 have outputs of zero volts on one line and −3 volts on the other, amplifiers 70 and 71 amplifying this to zero volts on one line and −11 on the other. Amplifiers 64 and 65 then should be biased to −5.5 volts and the output range should be within 0 to −11 volts so that gate control is maintained by amplifier 70 and 71. At resistor 27 is received, then, a voltage which will be added to the stepwise output of the error counter to provide a continuously varying signal 21 of Fig. 2.

Referring to Fig. 1, it can be seen that the essence of the invention is to provide a digital comparison of the directed signals and the executed signals, received from a transducer, and then add to the digital comparison a fine analog signal from the transducer. Thus, the ambiguity of a solely digital system is removed.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In an electronic circuit, converter means adapted to receive a first input electrical signal and transform said signal into a signal of discrete values, means connected to receive said signal of discrete values and adapted to receive a second signal of discrete values and provide an output indicating the difference between said signals, means for summing the difference signal in predetermined weighted relationship with said first input electrical signal.

2. In an electronic circuit, means adapted to receive a first input electrical signal and provide an electrical signal indicating the periodic variations thereof, means connected to receive said signal indicating periodic variations and adapted to receive a second input signal and provide an output signal indicating the difference between said signals, means for summing the difference signal in predetermined weighted relationship with said first electrical signal.

3. In an electronic circuit, means adapted to receive a first input electrical signal and provide an electrical signal indicating in digital form the periodic variations thereof, means connected to receive said signal indicating periodic variations and adapted to receive a second input electrical signal in digital form and provide an output signal indicating the difference between said signals, means for summing the difference signal in predetermined weighted relationship with said first electrical signal.

4. In an electronic circuit, means adapted to receive an input electrical signal sinusoidal in form and provide an electrical digital signal indicating the periodic variations thereof, means connected to receive said signal indicating periodic variations and adapted to receive an input electrical signal digital in form and provide an output signal indicating the difference between said digital signal and the periodic variations of said sinusoidal signal, means for summing the difference signal in predetermined weighted relationship with said input electrical signal sinusoidal in form.

5. In an electronic circuit, means for generating an input electrical signal which varies in accordance with executed motion in a given direction, converter means connected to receive and transform said signal into a signal of discrete values, comparison means connected to receive said signal of discrete values and adapted to receive a second input electrical signal of discrete values representing a directed motion and indicate the difference between said signals, means for combining the output of said comparison means in predetermined weighted relationship with said input electrical signal.

6. In an electronic circuit, means adapted to receive a plurality of input electrical analog signals periodic in form and displaced in phase, said signals representing executed motion in one direction or the opposite direction, respective means connected to receive said signals and indicate the periodic variations thereof, means connected to receive the respective signals of periodic variations and responsive thereto to provide an electrical signal indicating executed motion and direction, comparison means connected to receive said signals representing executed motion and direction and to receive a digital input electrical signal indicating directed motion and direction, said comparison means providing a signal indicating the difference between said executed motion and said directed motion, a fine error generator comprising means for combining said input electrical analog signals in predetermined manner according to the output of said means for indicating periodic variations, and means for combining the output of said fine error generator and said comparison means in predetermined proportion.

7. A fine error generator comprising input means adapted to receive a first periodic signal and provide a first and second periodic output 180 degrees out of phase with each other, means adapted to receive a second periodic signal and provide a first and second periodic output 180 degrees out of phase with each other, respective means connected to receive said first and second periodic signals and provide a signal indicating the periodic variations of each, means for gating the outputs of said input means in accordance with the output signals of said means indicating periodic variations, means for combining the output signals of said gating means.

8. A fine error signal generator comprising input means adapted to receive a first sinusoidal signal and provide a first and second output 180 degrees out of phase with each other, a second input means adapted to receive a second sinusoidal signal displaced in phase from said first sinusoidal signal and provide a first and second output 180 degrees out of phase with each other, a respective flip-flop connected to receive said first and second sinusoidal signals, gating means connected to control the output of said input means, said gating means connected to be controlled by the output of said flip-flops, means for summing the output of said gating means.

9. At least two transducers providing electrical signals according to motion in one direction or the opposite direction, the output of said transducers being displaced in phase with respect to each other, respective converter means connected to receive the output of each said transducer and transform said signal into a signal of discrete values, direction circuit means connected to receive the output of said converters and provide signals indicating the amount of motion and indicating the direction of motion indicated by said transducers, comparison means connected to receive the output of said direction circuit and adapted to receive input signals indicating the directed motion to be executed and the direction of motion to be executed, a fine error generator connected to receive the outputs of said transducers and connected to receive the outputs of said converters, the outputs of said transducers being combined according to the output of said converters, means for summing the output of said comparison means and said fine error generator.

10. At least two transducers providing periodically varying electrical signals according to motion in one direction or the opposite direction, the output of said transducers being displaced in phase with respect to each other, a respective flip-flop connected to receive the output of each said transducer and indicate the periodic variations thereof, direction circuit means connected to receive the output of each said flip-flop and provide a signal indicating the amount of motion and indicating the direction of motion indicated by said transducers, comparison means connected to receive the output of said direction circuit and adapted to receive an input signal indicating the directed motion to be executed by said transducers and the direction of executed motion, a fine error generator connected to receive the outputs of said transducers and connected to receive the outputs of said flip-flops, the outputs of said transducers being combined according to the output of said flip-flops, means for summing the output of said comparison means and said fine error generator.

11. A servo control system comprising a first member having a periodically-varying, magnetically recorded track therealong, a second member comprising at least two transducers adapted to provide an electrical signal according to executed motion along said track, respective flip-flop means connected to receive the signal from each said transducer and indicate the periodic variations thereof, direction circuit means connected to receive the output of said flip-flop means and provide signals indicating the amount of motion along said track and the direction of motion along said track, comparison means connected to receive the output of said direction circuit and adapted to receive an input digital signal indicating directed distance to be moved along said track and an input signal indicating direction, said comparison means indicating the difference between said executed signals and said directed signals, a fine error signal generator connected to receive the outputs of said transducers and said flip-flop means, said fine error signal generator combining the outputs of said transducers according to the outputs of said flip-flop means, means for combining in predetermined weighted relationship the output of said fine error signal generator and said comparison means, means responsive to the combined output to provide relative motion between said first member and said second member.

12. A first member having a sinusoidal, magnetically recorded track therealong a second member comprising at least two magnetic pickups displaced an odd number of quarter-wavelengths apart along said track, respective flip-flop means connected to receive the output of each said magnetic pickup, a direction circuit connected to receive the output of said flip-flops and provide a signal indicating distance said magnetic pickups move relative to said first member and another signal indicating direction said pickups move relative to said first member, comparison means connected to receive the output of said direction circuit and adapted to receive an input electrical signal indicating direction distance to be moved by said heads with respect to said first member and a second signal indicating direction, a fine error signal generator connected to receive the output of said magnetic pickups and connected to receive the output of said flip-flops and combine the output of said magnetic pickups in accordance with the output of said flip-flops, means for combining in predetermined weighted relationship the output of said fine error signal generator and said comparison means, means responsive to the combined output of said combining means so as to move said magnetic pickups relative to said first member.

13. The combination recited in claim 12 wherein said comparison means comprises random pulse synchronizing means connected to receive the output of said direction circuit and adapted to receive input digital electrical signals representing directed motion between said pickup heads and said first member and input electrical signal indicating direction of motion, whereby said input signals are synchronized, and a reversible digital counter connected to receive the output of said synchronizer.

14. In a system for controlling the relative motion of a tool and workpiece in response to control pulses, including transducer means responsive to increments of said relative motion to generate displacement signals, wherein said control pulses and displacement signals are applied to an error register the count condition of which is converted by a digital-to-analog converter into a representative voltage which controls said relative motion, the improvement in said system comprising means to add said displacement-signal voltage to said digital-to-analog converter output, and means to control said relative motion responsive to the sum thereof.

15. In a system for controlling the relative motion of a tool and workpiece in response to control pulses, including transducer means responsive to increments of said relative motion to generate displacement signals, wherein said control pulses and displacement signals are applied to an error register the count condition of which is converted by a digital-to-analog converter into a representative voltage which controls said relative motion, the improvement in said system comprising a summing network, means coupling said digital-to-analog converter output to said summing network, means coupling said transducer output to said summing network, and means to apply output from said summing network to control said relative motion.

16. In a system for controlling with pulse signals the relative incremental motion along separate co-ordinates of a tool and workpiece, there being provided for each co-ordinate a motion transducer to generate displacement signals in response to incremental motion along said co-ordinate, an error register to which pulse signals and displacement signals are applied and a digital-to-analog converter coupled to said error register to convert its count condition to a representative voltage which controls said relative incremental motion, the improvement in said system comprising, for each co-ordinate, a summing network, means coupling the digital-to-analog converter output to said summing network, means coupling the motion transducer output to said summing network, and means to control the relative motion along said co-ordinate with the output of said summing network.

17. In a digital-servoloop system wherein a digital input is converted to an analog value which is employed to drive the servo and there is a transducer to generate signals in response to the servo operation which are converted to digital form and fed to the input to reduce said digital input, the improvement in said system comprising means for adding said transducer signals to said analog value, and means for applying the output of said means for adding to said servo.

18. In a system for controlling with pulse signals the relative incremental motion along separate co-ordinates of a tool and workpiece, there being provided for each co-ordinate a motion transducer to generate displacement signals in response to incremental motion along said co-ordinate, an error register to which pulse signals and displacement signals are applied, and an analog-to-digital converter coupled to said error register to convert its count condition into a representative voltage which controls said relative incremental motion, the improvement in said system comprising for each co-ordinate means to combine the displacement signal with said digital-to-analog converter output, and means to control said relative incremental motion in response thereto.

References Cited in the file of this patent

UNITED STATES PATENTS 2,537,427    Seid et al.    Jan. 9, 1951
2,728,882    Cohen    Dec. 27, 1955